United States Patent [19]
Ishiwata et al.

[11] Patent Number: 5,969,855
[45] Date of Patent: *Oct. 19, 1999

[54] MICROSCOPE APPARATUS

[75] Inventors: Hiroshi Ishiwata, Yokosuka; Toyohiko Yatagai, Nagareyama; Masahide Itoh, Tsukuba, all of Japan

[73] Assignee: Olympus Optical Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/729,410

[22] Filed: Oct. 11, 1996

[30]  Foreign Application Priority Data

Oct. 13, 1995  [JP]  Japan ..................................... 7-265290
Dec. 26, 1995  [JP]  Japan ..................................... 7-339273

[51] Int. Cl.⁶ ................................................... G02B 21/06
[52] U.S. Cl. .......................... 359/386; 359/370; 359/371; 359/387
[58] Field of Search ..................................... 359/368–371, 359/385–387, 483–499, 558–561; 356/351, 359, 361; 382/279

[56]  References Cited

U.S. PATENT DOCUMENTS

| | | | |
|---|---|---|---|
| 4,795,246 | 1/1989 | Lord ......................................... | 359/371 |
| 4,964,707 | 10/1990 | Hayashi ................................... | 359/371 |
| 5,420,717 | 5/1995 | Tabata ..................................... | 359/371 |
| 5,572,359 | 11/1996 | Otaki et al. ............................. | 359/386 |
| 5,604,591 | 2/1997 | Kitagawa ................................. | 356/351 |
| 5,751,475 | 5/1998 | Ishiwata et al. ........................ | 359/387 |

FOREIGN PATENT DOCUMENTS

| | | |
|---|---|---|
| 5-232384 | 9/1993 | Japan . |
| 6-229724 | 8/1994 | Japan . |
| 7-60216 | 6/1995 | Japan . |
| 7-225341 | 8/1995 | Japan . |
| 7-261089 | 10/1995 | Japan . |
| WO 91/07682 | 5/1991 | WIPO ................................... 359/368 |

OTHER PUBLICATIONS

Akira Takahashi et al, "Inverse Problem in Microscopy", Denshi Tsushin Gakkai, Technical Research Report MBE 88–58, pp. 35–42, 1988.

Hiroshi Ooki "Theoretical Considerations on Phase Contrast Imaging" Optics, vol. 20 No. 9 Sep., 1991, pp. 590–594.

Toyohiko Yatagai, "Applications of Interferometry and Automated Inspection in Japan", Critical Reviews of Optical Science and Technology, vol. CR46, Nov. 1992.

K. Yamamoto, "Some improvements in the phase contrast microscope", Journal of Microsopy, vol. 129 Pt. 1, Jan. 1983, pp. 49–62.

*Primary Examiner*—Thong Nguyen
*Attorney, Agent, or Firm*—Pillsbury Madison & Sutro LLP

[57]  ABSTRACT

A microscope apparatus that has an electronic image pickup device arranged on an image surface of an imaging optical system, a component for separating light from a light source into two portions, a device for changing a phase difference between the two portions of light, a device for storing information on the images picked up by the image pickup device, and information processor for processing the information of images. The images are picked up by the electronic image pickup device as the phase difference is changed, and the information on the images is multiplied by a periodic function, as a weight function, which is given the phase difference as variable, and a resultant product is integrated so that a differential interference microscope apparatus capable of accurately obtaining a phase distribution of the object or a phase-contrast microscope apparatus capable of effectively enhancing a resolving power without lowering an image contrast is obtained.

12 Claims, 9 Drawing Sheets

CONVENTIONAL PHASE CONTRAST MICROSCOPE
$r_1 = 0.7$, $r_2 = 0.8$

BRIGHT FIELD OBSERVATION

MICROSCOPE APPARATUS

BACKGROUND OF THE INVENTION a) Field of the Invention

The present invention relates to a microscope apparatus for observing, with high resolving power, a transparent minute object such as bacteria or crystal structure of a metal, and specifically to that using a differential interference microscope or a phase-contrast microscope.

b) Description of the Prior Art

In general, a differential interference microscope is capable of forming an image showing unevenness or inclination of an object to be observed by separating light into ordinary ray and extraordinary ray using a birefringent prism, irradiating the object with these ordinary and extraordinary rays, and causing the rays to interfere as reflected from or transmitted through the object.

These days, attempts are made to measure the phase distribution or minute shape of an object to be observed by applying the conventional technique of two-beam interferometry to differential interference microscopy. In the field of semiconductor manufacturing, specifically, a method for measuring film thickness of a phase shifter of a phase shift mask with high precision is disclosed in Japanese Patent Preliminary Publication No. Hei 6-229724. "Applications of Interferometry and Automated Inspection in Japan, T. YATAGAI, SPIE. Vol. CR46, 1992" and Japanese Patent Preliminary Publication No. Hei 5-232384 show examples of the application of the fringe scan method in interferometry to differential interference microscopy.

When the differential interference microscope is used for the measurement of an object, it is regarded as a double-beam interferometer of the Mach-Zehnder type, as disclosed in Japanese Patent Preliminary Publication No. Hei 6-229724. In this approach information on the object with respect to phase etc. is obtained by determining the difference in optical path length between the ordinary ray and the extraordinary ray based on the supposition that light diffracted about the object has no affect.

In the conventional differential interference microscopy, the separation width between the ordinary ray and the extraordinary ray on the object surface is called "shear", which is set at a value as high as a resolving power of the microscope so that diffracted rays derived from the ordinary ray, and the extraordinary ray respectively, are caused to interfere to form an image. It is known that the shear is an important parameter for determining resolving power of the differential interference microscope and contrast of the image. Therefore, for measuring the phase distribution or minute shape of the object using the differential interference microscope, the shear specific to the differential interference microscope and effect of diffraction about the object should be considered.

However, the above-mentioned "Applications of Interferometry and Automated Inspection in Japan" and Hei 5-232384 suppose that all of the rays diffracted about the object are transmitted to an image surface, disregarding loss of diffracted light dependent on such parameters as numerical aperture of the optical system (response characteristic). Resultantly, accurate phase distribution of the object is difficult to be obtained from the image formed through such a method.

In a conventional phase-contrast microscope, a ring slit and a phase ring are arranged at a pupil position of an illumination system and a pupil position of an objective lens conjugate with the ring slit, respectively, and out of diffracted rays, zero-order rays are changed in phase and intensity to interfere with the remaining diffracted rays so that phase of a specimen (object) is converted into contrast of the image for observation.

As for contrast of phase-contrast image by a phase-contrast microscope, "Some Improvements in the Phase Contrast Microscope, K. YAMAMOTO, A. TAIRA, J. Microscopy, 129 (1983) 49–62", for example, describes a method for improving it. In conventional phase-contrast microscopy, in general, the contrast of the image is improved by arranging diameter of a ring-shaped phase film to be substantially half of a pupil diameter of the objective lens.

Japanese Patent No. Hei 7-60216 discloses a method for determining phase distribution of the object from a phase-contrast image by the phase-contrast microscope. However, as described in "Theoretical Considerations on Phase Contrast Imaging H. OOKI, Optics, Vol.20, No.9, 1991, pp 590–594, imaging by the phase-contrast microscope is disadvantageous in resolving power as compared with an ordinary bright-field microscope because the cutoff frequency is dependent on a ratio of the phase film diameter with the pupil diameter. This disadvantage could be moderated as the ratio approximates 1. However, as described in the above-mentioned document, such solution raises another problem of weakened contrast of the entire image, to obscure the image visually, because contrast of spatial frequency in a low band is weakened.

As a measure for enhancing the contrast without changing the diameter of the phase film, absorption by the phase film would be increased. However, if absorption by the phase film is increased, another problem is raised, as indicated by "Inverse Problem in Microscopy A. TAKAHASHI, I. NEMOTO, Denshi Tsushin Gakkai, Technical Research Report MBE88–58, pp 35–42, 1988, that, for a relatively thick specimen as compared with the wavelength of light, e.g. a biological specimen, an accurate phase-contrast image fails to be reproduced because spatial frequency components not existing in the original specimen (nonlinear terms) have an effect.

As stated above, conventional phase-contrast microscopes do not simultaneously satisfy both the requirements for resolution and image contrast.

Furthermore, according to the method recited in Japanese Patent No. Hei 7-60216, since phase distribution of the object is obtained directly from the phase-contrast image without consideration of the response characteristic of the phase-contrast microscope, the phase distribution obtained varies according to the frequency characteristic of the object. Furthermore, since this method disregards influence of nonlinear components such as halo also, uncertainty of phase distribution attributable to the nonlinear components still remains.

In consideration of the problems in the conventional phase-contrast microscopes, the present inventors have disclosed, in Japanese Patent Preliminary Publication No. Hei 7-225341, a phase-contrast microscope which is constructed so that resolving power is improved without weakening image contrast, and which is capable of accurately converting phase distribution of the object into contrast information.

SUMMARY OF THE INVENTION

An object of the present invention is to provide a differential interference microscope apparatus or a phase-contrast microscope apparatus, which is capable of providing a further enhanced contrast of an image and of accurately determining phase distribution of an object from the image observed.

In order to attain the above-mentioned object, a differential interference microscope apparatus according to the present invention comprises a light source, an illumination optical system for introducing light from the light source to an object, the illumination optical system including means for separating the light from the light source into an ordinary ray and an extraordinary ray, and an imaging optical system for forming a magnified image using the light transmitted through or reflected from the object. The imaging optical system includes a means for superposing the ordinary ray and the extraordinary ray on each other. The apparatus further comprises an electronic image pickup device disposed on an image surface of the imaging optical system, means for changing phase difference between the ordinary ray and the extraordinary ray, and a device for processing images picked up by the electronic image pickup device so that the images are picked up by the image pickup device as the phase difference between the ordinary ray and the extraordinary ray is changed and so that processed image information is obtained through integration of a product of the picked-up image information and a periodic function, as a weight function, which is given the phase difference between the ordinary ray and the extraordinary ray as a variable.

Furthermore, the differential interference microscope apparatus according to the present invention features that the periodic function as the weight function is substantially a sine function. Furthermore, the apparatus according to the present invention is capable of obtaining the processed image information with higher accuracy by operating the integration process for an interval of at least one substantial period of the periodic function.

In order to attain the above-mentioned object, a phase-contrast microscope apparatus according to the present invention comprises a light source, an illumination optical system for introducing light from the light source to the object, an imaging optical system for forming a magnified image of the object, a zonal or annular aperture arranged at a-pupil position of the illumination optical system, and a phase plate substantially similar to the aperture and arranged at a pupil position of the imaging optical system conjugate with the pupil position of the illumination optical system. The phase-contrast microscope is characterized in an improvement in that the phase plate is capable of changing the amount of phase difference and that the microscope apparatus further comprises an electronic image pickup device disposed on an image surface of the imaging optical system and means for storing images picked up by the image pickup device so that the images are picked up by the image pickup device as the phase difference is changed by the phase plate, and that processed image information is obtained through integration of a product of the picked-up image information and a periodic function, as a weight function, which is given the phase difference as a variable.

The differential interference microscope apparatus of the present invention is capable of abstracting phase information of an object from images by the differential interference microscope, by picking up images using a CCD camera as retardation is changed multiplying the picked up image information by a periodic function, as a weight function, which is given the retardation as a variable, and integrating the resultant product for an interval including at least one period of the periodic function, to obtain processed image information.

Also, the apparatus of the present invention is capable of the phase distribution of the object by subjecting the abstracted information to a process such as deconvolution.

Furthermore, the above-mentioned integration process, if operated for an interval of N periods (N >0), emphasizes the recomposed image etc.

Furthermore, the present invention allows an image proportional to the phase distribution of the object to be obtained by picking up phase-contrast images using the electronic image pickup device as the phase difference is changed by the phase plate, multiplying the phase-contrast image information by a periodic function, as a weight function, which is given the phase difference as a variable, and integrating the resultant product. Also, emphasizing contrast of the phase-contrast image is possible.

Additionally, the emphasis of contrast of the phase-contrast image can compensate the contrast lowered as the ratio of diameter of the ring slit and the phase film to the pupil diameter approximates 1, to resultantly enhance resolving power of the phase-contrast microscope.

By abstracting an image proportional to the phase distribution of the object and subjecting the abstracted image to a deconvolution process using a response function for the phase-contrast microscope, the phase distribution of the object can be accurately obtained.

This and other object as well as the features and the advantages of the present invention will become apparent from the following detailed description of the preferred embodiments when taken in conjunction with the accompanying drawings.

DETAILED DESCRIPTION OF THE PREFERRED EMBODIMENTS

Figure 1:
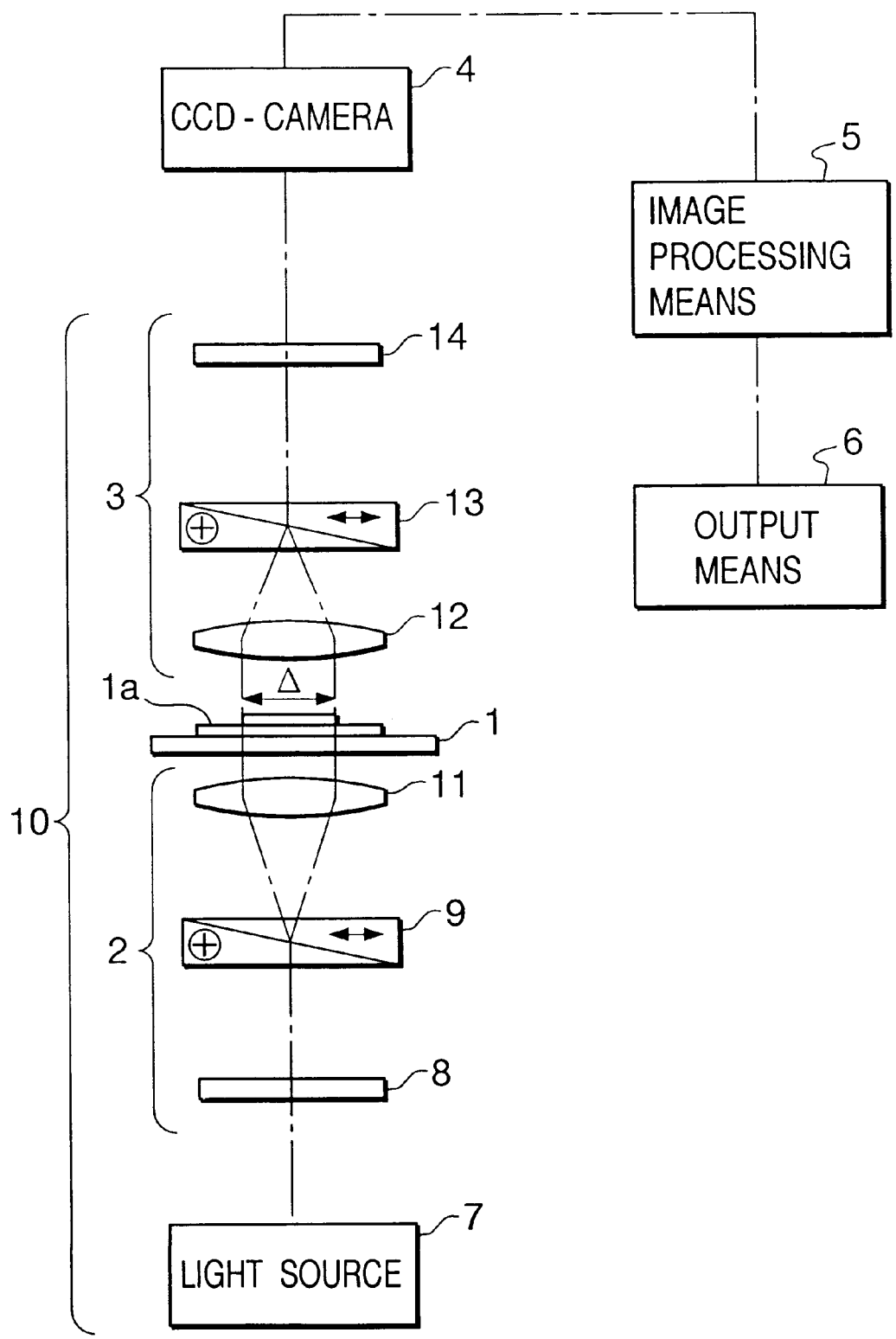
FIG. 1 is a schematic diagram showing a configuration of a first embodiment of the present invention applied to a differential interference microscope apparatus.

First of all, a principle of the present invention will be described based on a one-dimensional model where a pupil position of an optical system included in a differential interference microscope coincides with a localized position of a Nomarski prism.

Here, respective pupil functions of an illumination optical system and an imaging optical system included in the differential interference microscope are represented by $Q(\xi)$, $P(\xi)$, respectively. On the other hand, the application of the born approximation yields $$\exp\{i\phi(x)\}=1+i\phi(x) \quad (1)$$

where $\phi(x)$ is a phase distribution of an object (specimen). Then, an intensity distribution $I(x)$ of the object is given by a formula for partially coherent image formation as $$I(x) = R(0,0) + i\int [R(f,0) - R(0,-f)]\Phi(f)\exp(-ifx)df + \int\int \Phi(f)\Phi^*(f')R(f,f')\exp[-i(f-f')x]df\,df' \quad (2)$$

where $$R(f,f')=\int Q(\xi)P(\xi+f)P^*(\xi+f')d\xi$$

where $\Phi(f)$ is Fourier transform of $\phi(x)$, f spatial frequency, and $R(f, f')$ a transfer function for the partially coherent image formation, with $\Phi$ and $\Phi^*$, and P and P * being mutually conjugate functions, respectively. Now, since the differential interference microscope utilizes interference of polarized light, a coordinate system for polarization is introduced with respective directions of vibration of the ordinary ray and the extraordinary ray as separated by the Nomarski prism being set as coordinate axes.

In the differential interference microscope, light from a light source is linearly polarized by a polarizer and incident on the Nomarski prism to be separated into mutually perpendicularly polarized components (ordinary ray and extraordinary ray). Therefore, the pupil function of the imaging optical system $P(\xi)$ is expressed in the form of two-dimensional vector as $$P(\xi)=(aPx(\xi), bPy(\xi))$$

where a, b are the components of the linearly polarized light at the polarizer.

After that, the ordinary ray and the extraordinary ray, as separated, pass through two points separated by a shear$\Delta$ from each other on a surface of the object, respectively, are combined by a Nomarski prism disposed in the imaging optical system, and interfere with each other as passing through an analyzer, to form a resultant interference image on an image surface.

Therefore, considering that the light from the light source is separated into the ordinary ray and the extraordinary ray at the pupil position of the illumination optical system, allows one to derive $$R(f,f')=\int Q(\xi)AP(\xi+f)\cdot A^* P^*(\xi+f')d\xi \quad (3)$$

where $$A = \begin{pmatrix} \alpha\exp(-i\Delta\xi/2) & \beta\exp(i\Delta\xi/2) \\ 0 & 0 \end{pmatrix}$$

where $\alpha$ and $\beta$ are components of the polarized light at the analyzer.

Also given are $$Px(\xi)=\exp(i\Delta\xi/2\theta)p(\xi)$$

$$Py(\xi)=\exp(-i\Delta\xi/2)p(\xi) \quad (4)$$

where $\theta$ is a retardation between the ordinary ray and the extraordinary ray, $p(\xi)$ a pupil function for the imaging optical system in the case of bright field.

If it is supposed that directions of polarization by the polarizer and the analyzer are perpendicular to each other (crossed Nicols) and that the imaging optical system is an ideal optical system, Eq.(2) can be rewritten using Eq.(3) and Eq.(4) as $$I(x) = 4(a\alpha)^2\Big[\{1-\cos\theta\}M(0) + \\ i\sin\theta\int \sin(f\Delta/2)M(f)\Phi(f)\exp(-ifx)df + \\ \int\int \Phi(f)\Phi^*(f')R(f,f')\exp[-i(f-f')x]df\,df' \quad (5)$$

where $$M(f)=\int Q(\xi)p(\xi+f)p^*(\xi)d\xi$$

If the object is so thin as to allow the third term of Eq.(5) to be regarded as being nearly zero, one obtains is an approximation $$I(x)=4(a\alpha)^2\,[\{1-\cos\theta\}M(0) +i\sin\theta\int\sin(f\Delta/2)M(f)\Phi(f)\exp(-ifx)df]$$

Here, taking the retardation $\theta$ as a variable based on the supposition that $\theta$ can assume an arbitrary value, multiplying the intensity distribution on each point of the differential interference images of the object by $\sin\theta$, as a weight function, and integrating the resultant product for an interval of one period with respect to $\theta$ yields $$\int I(x)\sin\theta d\theta = 4(a\alpha)^2\Big[\int\{1-\cos\theta(t)\}\sin\theta d\theta\cdot M(0) + \\ i\int\sin^2\theta d\theta\cdot\int\sin(f\Delta/2)M(f)\Phi(f)\exp(-ifx)df\Big] = \\ 4i\pi(a\alpha)^2\int\sin(f\Delta/2)M(f)\Phi(f)\exp(-ifx)df \quad (5)$$

whereby components proportional to the gradient of the phase distribution of the object are abstracted.

If $\cos\theta$ is used as the weight function, one can derive $$\int I(x)\cos\theta d\theta=4\pi(a\alpha)^2\,M(0) \quad (8)$$

whereby a background of the differential interference image of the object is abstracted.

Furthermore, operating the processes according to Eq.(7) and Eq.(8) independently, storing respective sets of image information, which are obtained from the respective equations, in a storage of an image processor, and recombining these sets of image information upon multiplying them by arbitrary coefficients A, B respectively gives $$A \int I(x)\sin\theta(t)dt + B \int I(x)\cos\theta(t)dt = \qquad (9)$$
$$4\pi(a\alpha)^2 \left[ B \cdot M(0) + A \cdot i \int \sin(f\Delta/2) M(f) \Phi(f) \exp(-ifx) df \right]$$

If values of the coefficients A, B are appropriately selected, a differential interference image having good contrast as being linearly relating to the phase distribution of the object can be obtained.

On the other hand, since the differential information on the phase distribution of the object can be abstracted from Eq.(7), the phase distribution of the object can be derived by an integration process with respect to x after the process according to Eq.(7).

Fourier transform of the left- and right-hand members of Eq.(7) gives $$\int \{\int I(x)\sin\theta d\theta\} \exp(ifx) df = 4 i\pi(a\alpha)^2 \sin(f\Delta/2) M(f)\Phi(f) \qquad (10)$$

Upon dividing the left- and right-hand members of Eq.(10) by a response function $$\sin(f\Delta/2)M(f) \qquad (11)$$

which is obtained from the shear and imaging performance of the differential interference microscope, the Fourier transform is performed to give $$\int \left[ \int \left\{ \int I(x)\sin\theta d\, \theta \right\} \exp(ifx) df / \sin(f\Delta/2) M(f) \right] \exp(-ifx) df = \qquad (12)$$
$$4i\pi(a\alpha)^2 \phi(x)$$

whereby the phase distribution of the object is obtained. This process is called deconvolution, known as a method for accurately determining the phase distribution of the object from the image for observation by the microscope.

Furthermore, the integration processes shown in Eq.(7) and Eq.(8) are, not limited to the interval of one period, allowed to be operated for an interval of N periods (N>0), where Eq.(7) and Eq.(8) are rewritten as $$\int N I(x)\sin\theta d\, \theta = 4N i\pi(a\alpha)^2 \int \sin(f\Delta/2) M(f)\Phi(f) \exp(-ifx) df \qquad (13)$$

$$\int N I(x)\cos\theta d\, \theta = 4N \pi(a\alpha)^2 \cdot M(0) \qquad (14)$$

respectively. Through such an integration process for N periods, an image with enhanced contrast can be obtained on the occasion for recomposing the differential interference image, and measurement accuracy can be improved on the occasion for determining the phase distribution of the object.

Next, description will be made of a principle of the present invention in relation to the phase-contrast microscope apparatus.

Similar to the above-described case, respective pupil functions of an illumination optical system and an imaging optical system included in the phase-contrast microscope are represented by $Q(\xi)$, $P(\xi)$, respectively, and phase distribution of the phase object (specimen) by $\phi(x)$. Operating the weak phase approximation by Eq.(1) gives image intensity distribution I(x) of the phase object as shown in Eq.(2) above.

The pupil function $P(\xi)$ of the imaging optical system of the phase-contrast microscope can be expressed in the form of a linear combination of the functions as $$Pa(\xi) = \begin{cases} 1 & (NA_0 \le |\xi| < NA) \\ 0 & (NA_i \le |\xi| < NA_0) \\ 0 & (|\xi| < NA_i) \end{cases} \qquad (15)$$

$$Pb(\xi) = \begin{cases} 0 & (NA_0 \le |\xi| < NA) \\ 1 & (NA_i \le |\xi| < NA_0) \\ 0 & (|\xi| < NA_i) \end{cases}$$

where $P(\xi) = Pa(\xi) + APb(\xi)$
where $A = C\exp(-i\theta)$
C : amplitude transmission rate, $0 < C \le 1$
$\theta$: phase difference at a phase film If it is supposed here that the pupil function $Q(\xi)$ can be expressed as $Q(\xi) = Pb(\xi)$, Eq.(2) can be rewritten as $$I(x) = DC \left\{ 1 - \sin\theta \int F(f) \Phi(f) \exp(-ifx) df \right\} + \qquad (16)$$
$$\int \int \Phi(f) \Phi^*(f') R(f, f') \cdot \exp\{-i(f-f')x\} df df'$$

where $$DC = C^2 \int Pb(\xi) d\, \xi F(f) = 2 C \int Pb(\xi) Pa(\xi+f) d\, \xi / DC \qquad (17)$$

Consequently, image contrast by the phase-contrast microscope is approximately expressed by Eq.(16), in which $\theta$ is the amount of phase difference given to zero-order ray at the phase film. Eq.(17) expresses a response function of the phase-contrast microscope.

If the phase difference $\theta$ can assume an arbitrary value and therefore is continuously changeable, $\theta$ can be given as a variable. Multiplying the image information obtained by the phase-contrast microscope by a sine function $\sin\theta$, as a weight function, which is given $\theta$ as a variable, and integrating the product for an interval of 1 period of the sine function is approximately expressed as $$\int I(x)\sin\theta d\, \theta = \int DC \left[ \left\{ 1 - \sin\theta \int F(f) \Phi(f) \exp(-ifx) df \right\} + \qquad (18)$$
$$\int \int \Phi(f) \Phi^*(f') R(f, f') \cdot \exp\{-i(f-f')x\} df df' \right] \cdot \sin$$
$$\theta d\, \theta = \pi DC \left\{ \int F(f) \Phi(f) \exp(-ifx) df \right\}$$

Operation according to Eq.(18) allows one to abstract the phase distribution components of the object. Furthermore, it attains contrast $\pi$ times as high as conventional phase-contrast microscopy does.

This integration, if operated for an interval of N periods, is expressed as $$\int_n I(x)\sin\theta d\, \theta \approx N\pi DC \left\{ \int F(f) \Phi(f) \exp(-Ifx) df \right\} \qquad (19)$$

to show that $N\pi$-times emphasis of the image with respect to the phase distribution components is possible.

In Eq.(18), the approximation is made based on the supposition that the influence of nonlinear components such as halo, is small. However, even if halo components exist, Eq.(18) remains true because the integration process according to the present invention cancels the halo components, which do not depend on the phase difference at the phase film.

Next, the Fourier transform of Eq.(18) yields $$\int\{\int I(x)\sin\theta d\,\theta\}\exp(ifx)df = \pi DC \cdot F(f)\cdot \Phi(f) \qquad (20)$$

Upon dividing the left- and right-hand members of Eq.(20) by $\pi DC \cdot F(f)$, the Fourier transform is performed to obtain $$\phi(x) = \int\left[\int\left\{\int I(x)\sin\theta(t)dt\right\}\exp(ifx)df/\pi DC\cdot F(f)\right]\exp(-ifx)df \qquad (21)$$

F(f) in Eq.(21) is given, from Eq.(17), as $$F(f) = 2\ C\int Pb(\xi)Pa(\xi+f)d\xi/\ DC$$

This process is called "deconvolution", which is a method for obtaining the amplitude distribution or phase distribution of the object from the image intensity distribution of the object using response characteristics of optical systems. As for F(f), it can be obtained from the pupil functions of the illumination optical system and the imaging optical system. If F(f) is given, then the phase distribution of the object can be obtained from Eq.(21) upon the integration process according to Eq.(18) being performed.

Furthermore, accuracy of the phase distribution of the object is improved if the deconvolution process is performed after the integration process according to Eq.(19).

The above derivation of equations is based on a supposition that the diameters of the ring slit and the phase film coincide. However, a phase-contrast microscope, in reality, arranges the diameter of the phase film a little larger than the diameter of the ring slit. Even under such a condition, it remains true that $$Q(\xi) = \begin{cases} 1 & (NA_{0'} \leq |\xi| < NA) \\ 0 & (NA_{i'} \leq |\xi| < NA_{0'}) \\ 1 & (|\xi| < NA_{i'}) \end{cases} \qquad (22)$$

where $NA_i \leq NA_{i'}$, $NA_0 \leq NA_0$

If the shape of the ring slit satisfies Eq.(22), F(f) can be determined from $$F(f) = 2\ C\int Q(\xi)Pa(\xi+f)d\,\xi/DC$$

Next, description will be made of embodiments of the present invention with reference to the drawings. Firstly, embodiments of the present invention applied to the differential interference microscope apparatus are described.

First Embodiment

The apparatus of the first embodiment utilizes a differential interference microscope of transmission type. FIG. 1 is a schematic diagram showing the configuration of the differential interference microscope apparatus according to the first embodiment. A differential interference microscope 10 used in the apparatus of this embodiment comprises a stage 1 on which an object 1a is placed, an illumination optical system 2, an imaging optical system 3 and a light source 7. The illumination optical system 2 includes a polarizer 8, a Nomarski prism 9 and a condenser lens 11, while the imaging optical system 3 includes an objective lens 12, a Nomarski prism 13 and an analyzer 14. In the differential interference microscope 10, light emanating from the light source 7 is linearly polarized by the polarizer 8 and then separated into ordinary ray and extraordinary ray by the Nomarski prism 9, to be spaced a shear$\Delta$ apart on the object with intervention of the condenser lens 11, where the Nomarski prism 9 is positioned so that a separation point of the ordinary ray and the extraordinary ray is localized on the pupil position of the condenser lens 11. Then the ordinary ray and the extraordinary ray, after being transmitted through the object 1a and the objective lens 12, are combined together by the Nomarski prism 13 positioned so that a superposition point of the ordinary ray and the extraordinary ray is localized on the pupil position of the objective lens 12, and form a differential interference image on an image surface of the differential interference microscope 10 due to mutual interference caused as they are transmitted through the analyzer 14.

In the configuration, a monochromic filter is arranged in the light source 7 to regulate the wavelength of the illumination light to be 550 nm. The Nomarski prisms 9, 13 are arranged so that the direction of the shear produced by them lies in the plane of the figure. The polarizer 8 and the analyzer 14 are arranged to have planes of polarization which make an angle of 45° with the plane of the figure, respectively, upon keeping crossed Nicol correlation. The Nomarski prism 9 is displaceable in the arrowed direction in the figure, where, in the range of the displacement, positions at which retardation becomes 0 and 2 $\pi$(550 nm) respectively are preliminarily determined and set as references. The Nomarski prism 9 is connected with a step motor, not shown, which is controlled by a controller with respect to the amount of the displacement, to be displaced thereby in steps of a value d/n (a distance d between the above-mentioned positions for 0 and 2 $\pi$retardations divided by a natural number n).

In the apparatus of this embodiment, an alternative configuration is possible, where the Nomarski prism 9 is fixedly disposed and the Nomarski prism 13 is provided with such a drive mechanism as described above, instead, to be displaceable in the arrowed direction in the figure.

Furthermore, in the apparatus of this embodiment, a light receiving surface of a CCD camera 4 is arranged on the image surface of the differential interference microscope 10, so that the CCD camera 4 picks up an image obtained by the differential interference microscope 10 and transmits it, as an image signal, to an image processor 5 provided with an image storing device. The image processor 5 is connected with an output device 6 which is capable of presenting both of the image obtained by the differential interference microscope 10 for direct observation and an image obtained through processing by the image processor 5. The light receiving surface (including CCD picture elements) of the CCD camera 4 is fixed in such a manner that its longitudinal or lateral side is parallel with the plane of FIG. 1.

Now, description is made of a method for obtaining phase distribution etc. of the object using the differential interference microscope apparatus according to this embodiment.

Figure 2:
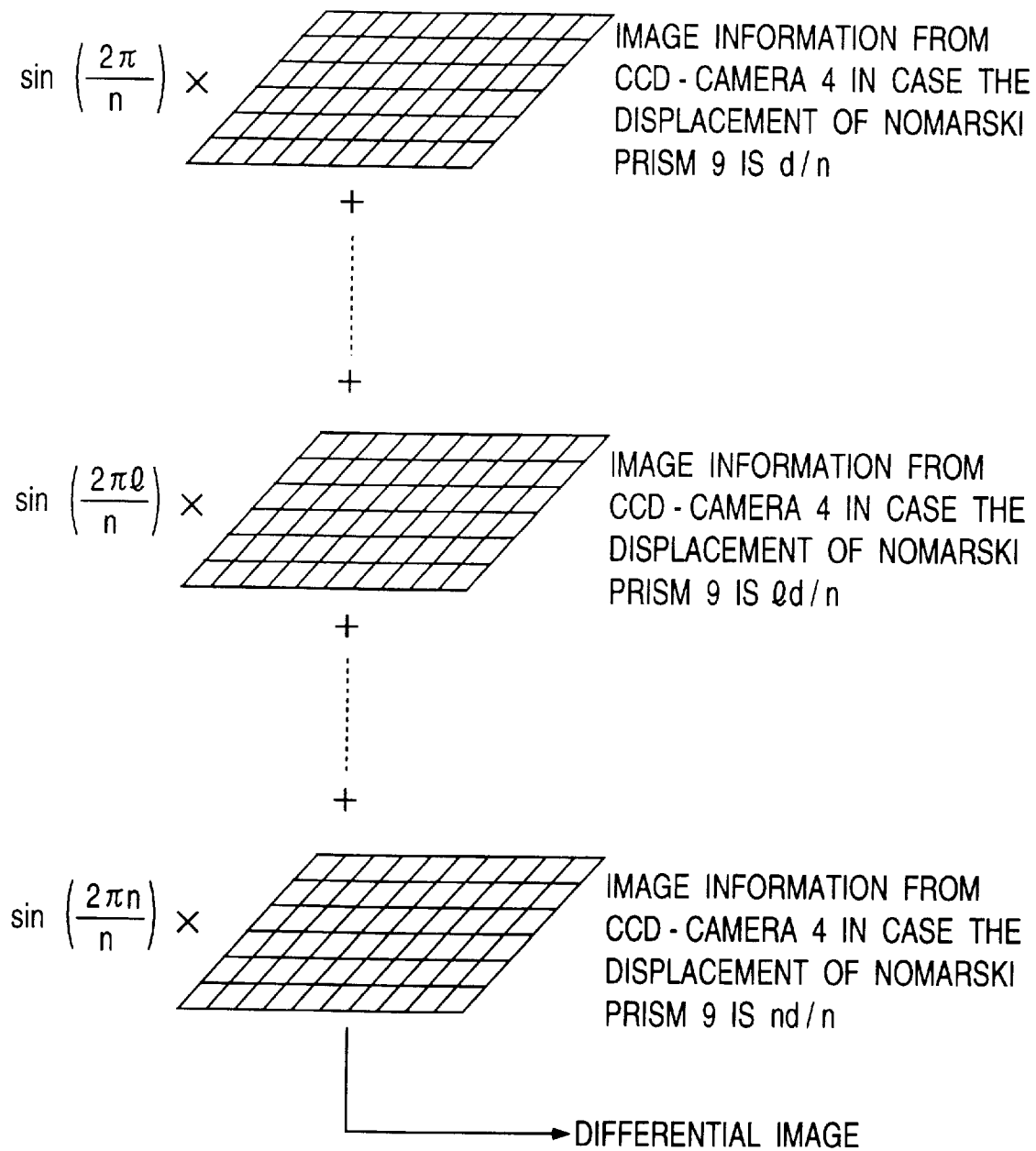
FIG. 2 illustrates a method for obtaining a differential image of an object using the differential interference microscope apparatus shown in FIG. 1.

Firstly, the Nomarski prism 9 (or 13) is displaced from the position for 0 retardation, while, at every step of displacement by d/n, images formed by the differential interference microscope 10 are sequentially picked up by the CCD camera 4, as shown in FIG. 2, to be stored in the image storing device in the image processor 5. Then, image information on each picture element thus picked up through the retardation change is multiplied by $$\sin(2\,\pi l/n)\ \text{where}\ 0\ \leq l \leq n$$

and then integrated. Through this process including integration, differential information on phase distribution of the object is obtained, as abstracted, to be exclusively stored in the image processor 5. Furthermore, by subjecting this differential information to a deconvolution process using a response function determined from the numerical aperture of the objective lens 12 and other parameters such as the shear, the phase distribution of the object can be obtained. Calculations for deriving these results in the image processing are detailed before. Data on the phase distribution, etc. is then output to the output device 6, etc.

Figure 3:
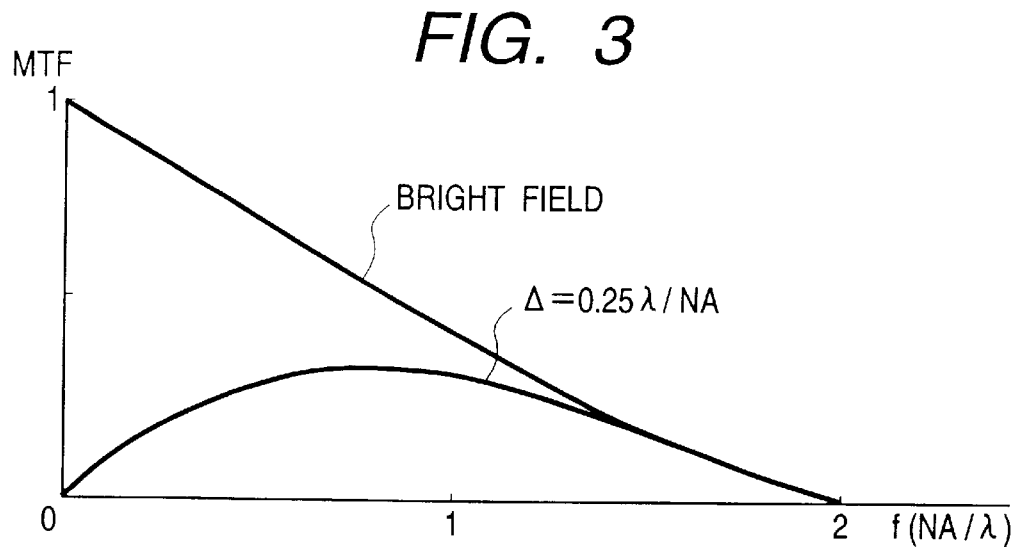
FIG. 3 graphs an example of a response function applied to the differential interference microscope apparatus shown in FIG. 1.

FIG. 3 shows a response function of the phase gradient $$g(f)=\sin(f\Delta/2)M(f) \qquad (23)$$

as the pupil diameter of the illumination optical system 2 assumes 1, the retardation $\pi/2$, and the shear $0.25\lambda/NA$, plotted in a coordinate system normalized with the numerical aperture of the objective lens 12 being NA and the pupil diameter of the imaging optical system 3 being 1 (in a domain of $f \geq 0$).

The response function expressed by Eq.(23) is an odd function, that the graph, if appears including a domain of f<0, obviously assumes revolving symmetry with respect to the origin.

A response function in the case of bright field observation also is plotted for comparison in FIG. 3.

Figure 4:
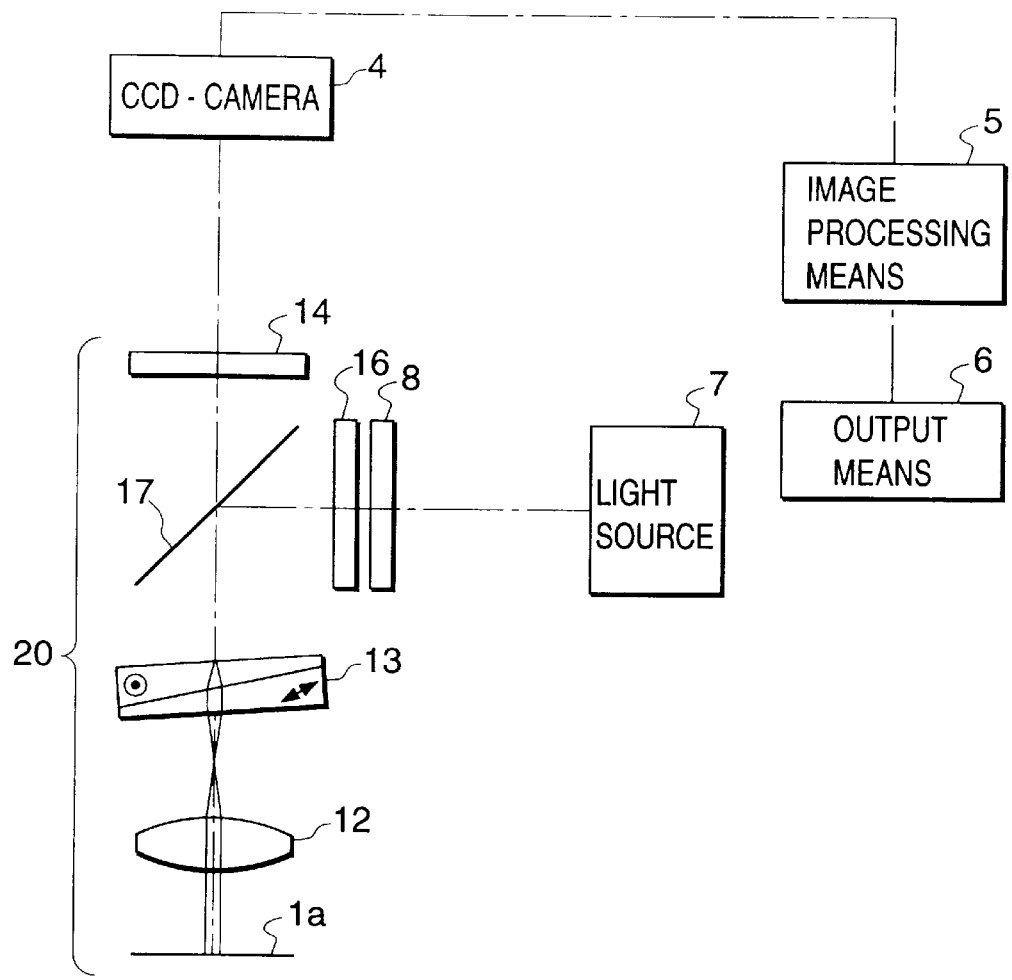
FIG. 4 is a schematic diagram showing a configuration of a second embodiment of the present invention applied to a differential interference microscope apparatus.

Second Embodiment FIG. 4 is a schematic diagram showing the configuration of the differential interference microscope apparatus according to the second embodiment using a differential interference microscope of reflection type, in which an objective lens 12 and a Nomarski prism 13 are commonly used for an illumination optical system and an imaging optical system. In the differential interference microscope 20 used in the apparatus of this embodiment, light emanating from a light source 7 is linearly polarized by a polarizer 8, transmitted through a ¼-wave plate 16, and then reflected from a half mirror 17 in a downward direction. The reflected light is transmitted through the objective lens 12 via the Nomarski prism 13 which is arranged so that a separation point of ordinary ray and extraordinary ray is localized on a pupil position of the objective lens 12, to be spaced a shear$\Delta$ apart on an object la upon being separated into the ordinary ray and the extraordinary ray. The ordinary ray and the extraordinary ray reflected from the object are re-transmitted through the objective lens 12, combined by the Nomarski prism 13, transmitted through the half mirror 17 and then forms a differential interference image on an image surface of the differential interference microscope 20 due to mutual interference caused as they are transmitted through an analyzer 14.

According to the second embodiment also, similar to the apparatus of the first embodiment, a light receiving surface of a CCD camera 4 is arranged on the image surface of the differential interference microscope 20, so that the CCD camera 4 picks up an image formed by the differential interference microscope 20 and transmits it, as an image signal, to an image processor 5 provided with an image storing device. The image processor 5 is connected with an output device 6 which is capable of presenting both of the image obtained by the differential interference microscope 20 for direct observation and an image obtained through processing by the image processor 5.

The ¼-wave plate 16 is fixed in such a manner that one of its fast axis and slow axis coincides with a direction of polarization by the analyzer 14. The polarizer 8 is constructed to be rotatable about an optical axis and connected with a step motor, not shown, which is controllable with respect to the angle of the rotation.

Now, description is made of a method for obtaining the phase distribution etc. of the object using the differential interference microscope apparatus according to this embodiment.

Initially, a position of the polarizer 8 at which retardation becomes 0 is determined through rotational adjustment of the polarizer 8, and set to be the rotation angle 0° position as a reference.

Figure 5:
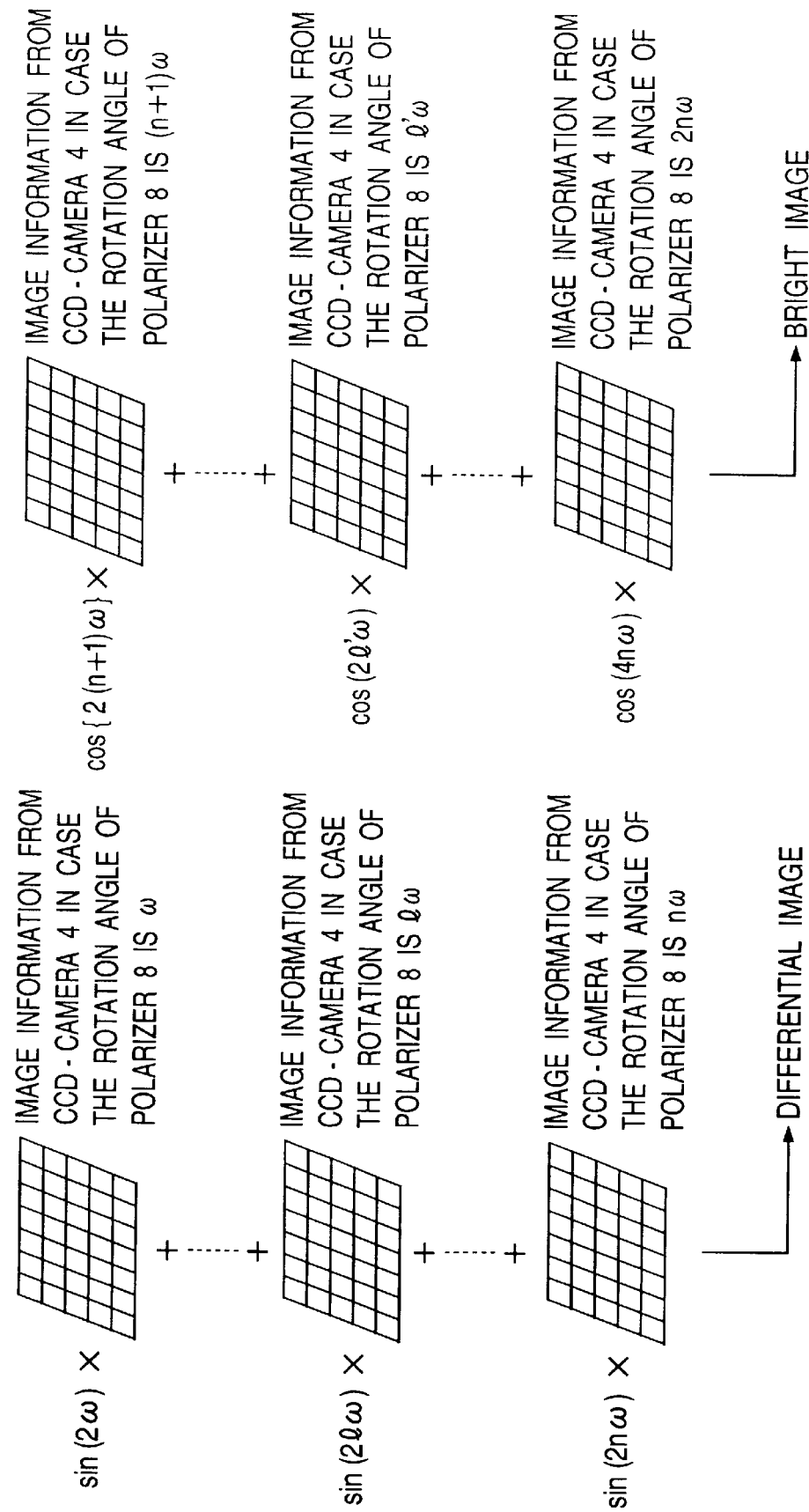
FIG. 5 illustrates a method for obtaining a differential image and a bright-field image of the object using the differential interference microscope apparatus shown in FIG. 4.

Then, the step motor is controlled to drive the polarizer 8 to rotate in steps of an angle $\omega$ ($\omega=180°/n$, n: natural number) from the 0° position until it completes 180° rotation, while, at every step of rotation by $\omega$, images formed by the differential interference microscope 20 are sequentially picked up by the CCD camera 4, as shown in FIG. 5, to be stored in the image storing device in the image processor 5. Then, image information on each picture element thus picked up through the retardation change is multiplied by $$\sin(2\,l\omega)\ \text{where}\ 0 \leq l \leq n$$

and then integrated. Resultant image information obtained through this process is stored in the image storing device as a differential image.

After that, the polarizer 8 is again driven to rotate from the 180° position until it completes 360° rotation in reference to the initial 0° position, while, at every step of rotation, images obtained by the differential interference microscope 20 are sequentially picked up by the CCD camera 4 to be stored in the image storing device in the image processor 5. Then, image information on each picture element thus picked up through the retardation change is multiplied by $$\cos(2\,l'\omega)\ \text{where}\ n \leq l' \leq 2n$$

and then integrated. Resultant image information obtained through this process is stored in the image storing device as a bright-field image.

Furthermore, from these two sets of image information (the differential image and the bright-field image) stored in the image storing device, a differential interference image is recomposed, to be output to the output device 6. Also, the differential image is further subjected to a deconvolution process to derive the phase distribution of the object, to be output to the output device 6. Calculations for deriving these results in the image processing are detailed before.

While the apparatus of this embodiment is constructed to arrange the polarizer 8 to be rotatable as means for changing retardation, equivalent retardation change can be achieved by arranging the analyzer 14, instead of the polarizer 8, as being rotatable.

Third Embodiment

The apparatus of the third embodiment also uses a differential interference microscope of transmission type, and is configured similar to the apparatus of the second embodiment shown in FIG. 4.

According to the third embodiment, initially, a position of a polarizer 8 at which retardation becomes 0 is determined through rotational adjustment of the polarizer 8, and set to be the rotation angle 0° position as a reference.

Figure 6:
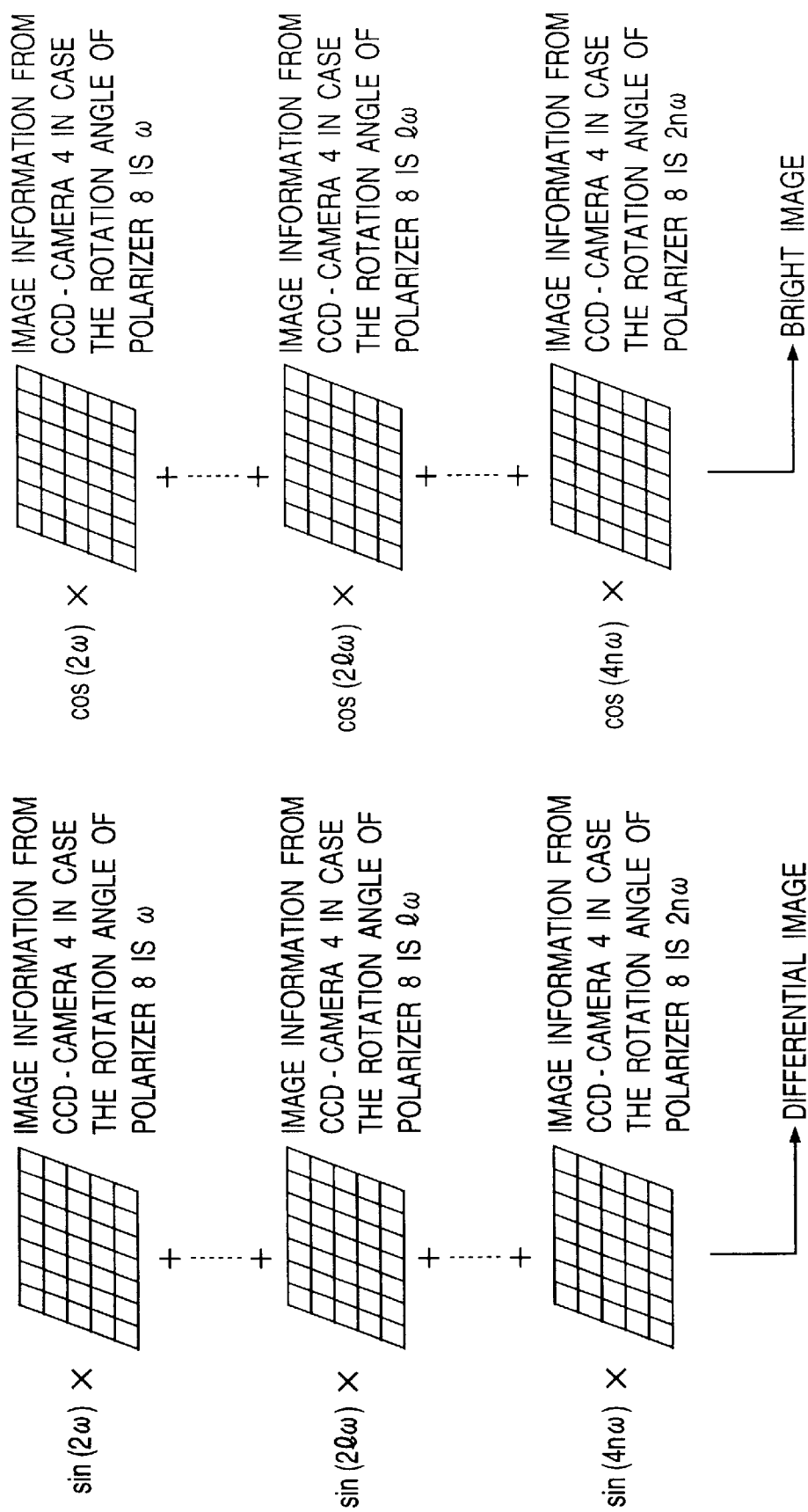
FIG. 6 illustrates a method for obtaining a differential image and a bright-field image of the object using a differential interference microscope apparatus having a configuration similar to that shown in FIG. 4.

Then, a step motor is controlled to drive the polarizer 8 to rotate in steps of an angle $\omega$ ($\omega=180°/n$, n: natural number) from the 0° position, while, at every step of rotation, images formed by a differential interference microscope 20 are sequentially picked up by a CCD camera 4, as shown in FIG. 6, to be stored in an image storing device in an image processor 5. Then, image information on each picture element thus picked up through the retardation change is multiplied by $$\sin(2\,l\omega)\ \text{where}\ 0 \leq l \leq 2n$$

and then integrated. This process is defined as a differential image process. Also, simultaneously, the image information on each picture element picked up the retardation change is multiplied by $$\cos(2\,l\omega)\ \text{where}\ 0 \leq l \leq 2n$$

and then integrated. This process is defined as a bright-field image process.

These two processes are operated for one turn (360° rotation) of the polarizer 8. The resultant differential image and the bright-field image are stored in the image storing device of the image processor 5.

Furthermore, in the apparatus of this embodiment, a recomposed image is produced through an operation according to A×(differential image)+B×(bright-field image)

where A, B are appropriate coefficients, to be output to an output device 6. Coefficients A, B are adjusted for adjustment of contrast and stereoscopic impression of a displayed image, as output to the output device 6.

Since the differential image and the bright-field image are obtained through integration for an interval including two periods, the images are emphasized twice as much as those obtained through integration for an interval of one period. The integration is, not limited to the interval of 2 periods, it is allowed to be operated for a longer interval as required, to achieve higher emphasis of the image for further to repetition of periods in the interval.

It is noted that the integration operated with respect to image information picked up through one turn of the polarizer 8 is regarded as an integration for an interval of two periods, equivalent to an integration for an interval of one period repeated twice.

Next, embodiments of the present invention applied to phase-contrast microscopes will be described. In these embodiments, similar members are designated by similar symbols used in the above described embodiments.

Fourth Embodiment

Figure 7:
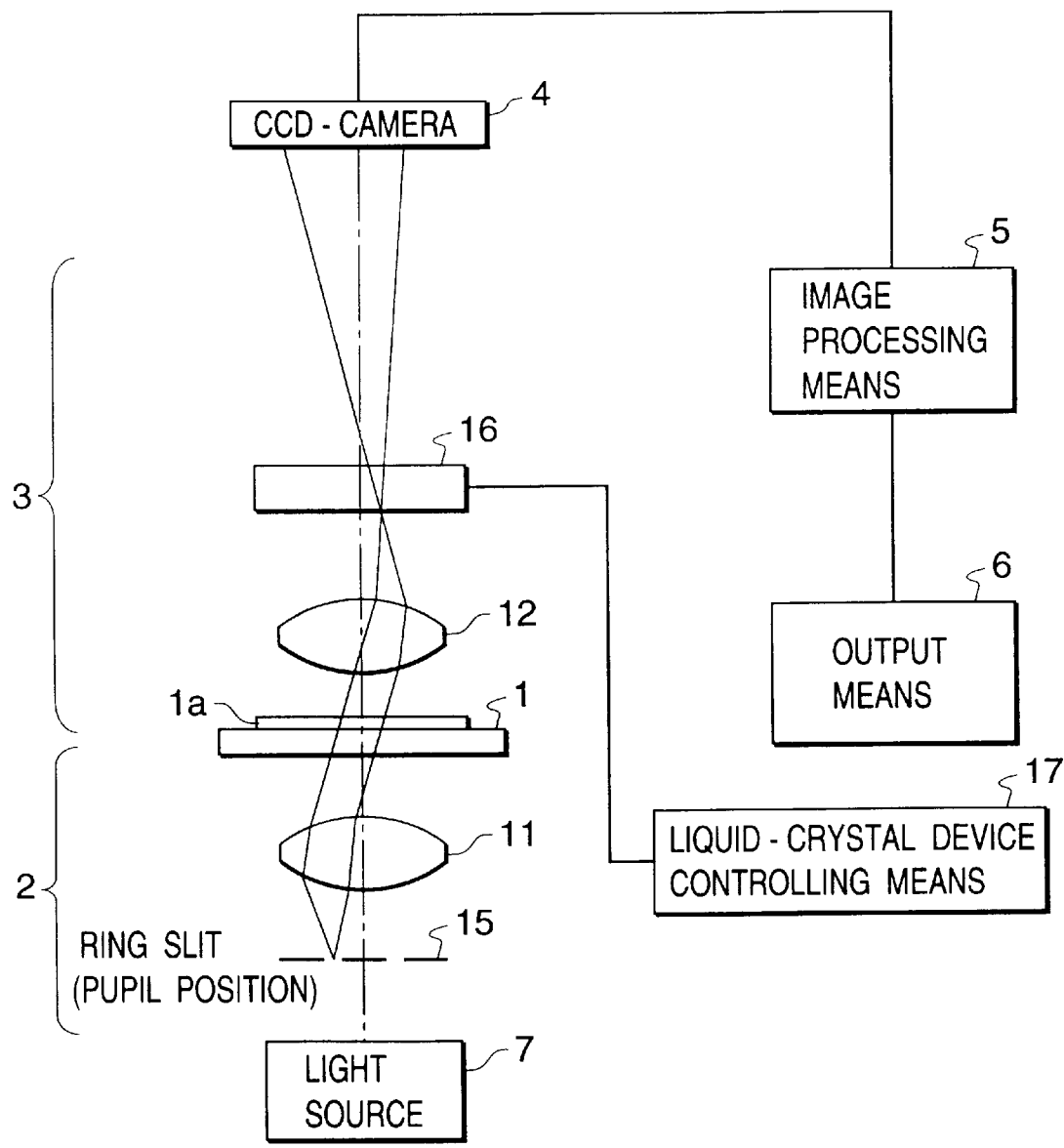
FIG. 7 is a schematic diagram showing a configuration of a fourth embodiment of the present invention applied to a phase-contrast microscope apparatus.

According to the fourth embodiment, as shown in FIG. 7, a ring slit 15 as an aperture having an arbitrary contour is arranged at a pupil position of an illumination optical system 2 having a condenser lens 11, and a phase plate 16 forming a phase ring shaped similar to the ring slit 15 is arranged at a pupil position of an imaging optical system 3 having an objective lens 12, for the purpose of observing a sample (object) 1a, as illuminated by the illumination optical system 2, applying the phase-contrast method.

According to this embodiment, an image formed by the imaging optical system 3 is picked up by an electronic image pickup device (CCD) 4 arranged on an image surface of the imaging optical system 3. The picked up images are stored in an image storing device (frame memory) and then are subjected to calculation processes including integration in an image processor 5, so that phase-contrast image information is obtained. The phase-contrast image information is transmitted to an output device 6.

Figure 8:
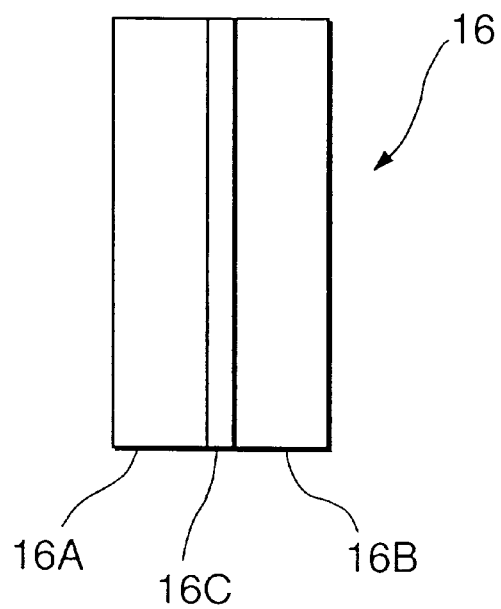
FIG. 8 illustrates construction of the phase plate shown in FIG. 7.
Figure 9:
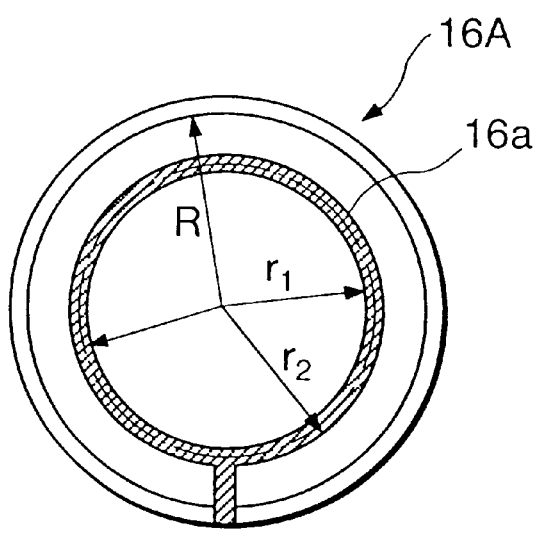
FIG. 9 is a front view of FIG. 8.
Figure 10:
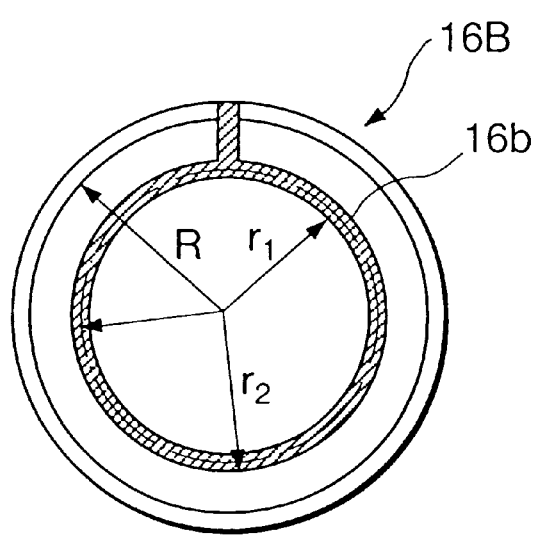
FIG. 10 is a rear view of FIG. 8.

The phase plate 16 includes, as shown in FIG. 8, a liquid crystal 16C sandwiched between parallel plates 16A, 16B. The parallel plates 16A, 16B are coated with transparent electrodes 16a, 16b, respectively, one of which or each of which is coated with an absorption film. If the absorption film is provided only for one of the electrodes, it is designed to have a transmission rate about 10–15%, while, if provided for each of the electrodes, it is designed to have a resultant transmission rate about 10–15% as two-layered. In this embodiment, the transparent electrodes 16a, 16b have an inside radius r1 of 0.7 and an outside radius r2 of 0.8, where the values are normalized with a pupil radius R being set to 1.

Phase-contrast images are picked up by the electronic image pickup device 4 as the phase difference is changed at the phase plate 16 of liquid crystal type, which is arranged in vicinity of a pupil position of the imaging optical system 3, and these images are subjected to calculation processes.

The transparent electrodes 16a, 16b of the phase plate 16 are connected with a liquid crystal control means 17, which controls, via the transparent electrodes 16a, 16b, a voltage applied to the liquid crystal 16C so that optical path difference of light transmitted therethrough from light transmitted through the remaining portions of the phase plate 16 is changed.

Here, the relationship between the optical path difference (phase difference) of the light transmitted through the electrodes from the light transmitted through the remaining portions and the voltage applied to the liquid crystal 16c is preliminarily determined through initial adjustment of the voltage.

Firstly, a value of the voltage at which the phase difference at the phase plate 16 becomes 0 is determined. Then, from this value of the voltage for 0 phase difference, determined are values of the voltage corresponding to values of the phase difference to be changed in steps of $2\pi/n$ (n: natural number).

Figure 11:
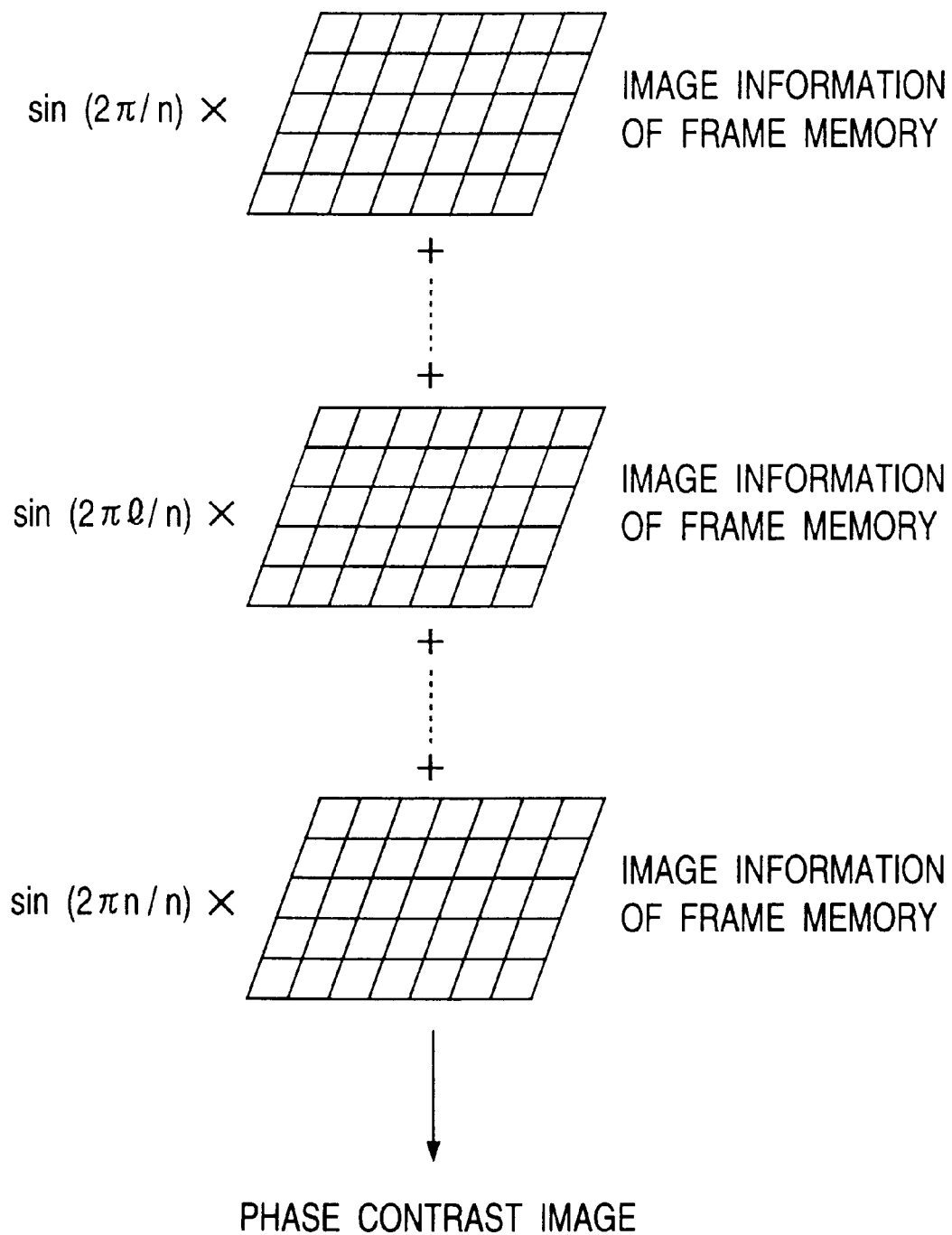
FIG. 11 illustrates the concept of the integrating process for each picture element applied to the phase-contrast microscope apparatus shown in FIG. 7.

Based on the preliminary setting described above, the voltage applied to the liquid crystal 16C is changed to change the phase difference at the phase plate 16 in steps of $2\pi/n$, while, at every step of phase difference change by $2\pi/n$, phase-contrast images are picked up by the electronic image pickup device 4, as shown in FIG. 11. Then, image information on each picture element thus picked up through the phase difference change is multiplied by $\sin(2\pi l/n)$ where $0 \leq l \leq n$ and then integrated, to obtain processed image information. Since this processed image information consists of components proportional to the phase distribution of the object 1a, as abstracted from the visible images via the microscope, a contrast approximately $\pi$ times as high as that attained through usual phase-contrast microscopy can be achieved.

Figure 12:
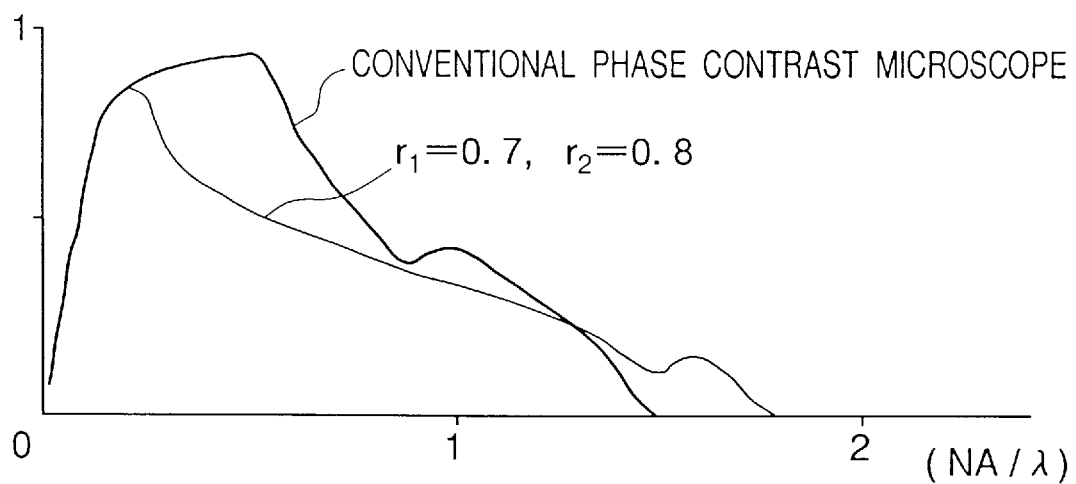
FIG. 12 graphs respective response functions for a conventional phase-contrast microscope apparatus and that according to the present invention.

If it is supposed that the ring slit 15 and the phase plate 16 are conjugate, and if the pupils of the illumination optical system 2 and the imaging optical system 3 are considered two-dimensionally, an operation $$\int Pb(\xi)Pa(\xi+f)d\xi \qquad (24)$$

derives a result shown in FIG. 12.

In FIG. 12, abscissae correspond to the ratio of numerical aperture NA of the imaging optical system 3 to wavelength $\lambda$ of light from the light source 7 (NA/$\lambda$), normalized with a pupil radius of the imaging optical system 3 being set to 1, while ordinates correspond to MTF where Eq.(10) is normalized with $\int Pb(\xi)d\xi$.

In FIG. 12, a response function (where r1=0.4, r2=0.5) of a conventional phase-contrast microscope also is plotted for comparison with the response function (where r1=0.7, r2=0.8) according to this embodiment. From these two response functions plotted in FIG. 12, it it deduced that resolving power of the phase-contrast microscope can be increased by increasing the radius of the ring slit 15. On the other hand, the integration process disclosed by the present invention improves contrast of images.

Therefore, if the configuration of this embodiment is employed, the resolving power of the phase-contrast microscope utilized and the contrast of the image can be improved simultaneously.

In this case, it is desirable that the numerical aperture concerning a light beam incident on the electronic image pickup device (CCD) 4 satisfies $\lambda/NA \geq 2u$ where λ is a wavelength of illumination light, and u a size of each picture element of the electronic image pickup device 4. Even if the resolving power of the imaging optical system 3 is improved, the image pickup system having a cutoff frequency lower than that of the imaging optical system 3 degrades definition of an image picked up.

Fifth Embodiment

According to the fifth embodiment, based on a supposition that a ring slit 15 and a phase ring which is formed in a phase plate 16 are conjugate, a phase plate of liquid crystal type similar to that used for the fourth embodiment is used, except that it is provided with an absorption film having a transmission rate of 80%.

Similar to the fourth embodiment, a value of the voltage (applied to a liquid crystal 16C) at which phase difference at the phase plate 16 becomes 0 is determined. Then, from this value of the voltage for 0 phase difference, values of the voltage corresponding to values of the phase difference to be changed in steps of 2 π/n (n: natural number) are determined.

Based on the preliminary setting described above, the voltage applied to the liquid crystal 16C is changed to change the phase difference at the phase plate 16 in steps of 2 π/n, while, at every step of phase difference change by 2 π/n, phase-contrast images are picked up by an electronic image pickup device 4. Then, image information on each picture element thus picked up through the phase difference change is multiplied by $\sin(2\pi l/n)$ where $0 \leq l \leq n$ and then integrated. This process, including integration is operated three times successively, whereby contrast of a phase-contrast contrast image approximately 1.3π times as high as that attained using a phase plate coated with an absorption film having a transmission rate of 15%. According to this embodiment, a high contrast is attainable even if the phase plate is not coated with an absorption film that has low transmission rate.

Furthermore, the absorption film of high transmission rate provided for the phase plate 16 lessens influence of nonlinear components such as halo, to allow a phase-contrast image directly proportional to phase distribution of the object to be accurately obtained.

Also, similar to the Fourth embodiment, an accurate phase distribution can be obtained through a deconvolution process using the response function shown in FIG. 12.

Sixth Embodiment

According to the sixth embodiment, based on a supposition that a ring slit 15 and a phase ring which is formed in a phase plate 16 are conjugate, a phase plate of liquid crystal type similar to that used for the fourth embodiment is utilized, where the phase ring has an inside radius r1 of 0.872 and an outside radius r2 of 0.938 and is formed by electrodes coated with an absorption film having a transmission rate of 80%, one of the electrodes being non-annularly shaped to cover a full surface of a parallel plate.

Similar to the fourth embodiment, a value of the voltage (applied to a liquid crystal 16C) at which phase difference at the phase plate 16 becomes 0 is determined. Then, from this value of the voltage for 0 phase difference, values are determined of the voltage corresponding to values of the phase difference to be changed in steps of 2π/n (n: natural number).

Based on the preliminary setting described above, the voltage applied to the liquid crystal 16C is changed to change the phase difference at the phase plate 16 in steps of 2π/n, while, at every step of phase difference change by 2π/n, phase-contrast images are picked up by an electronic image pickup device 4. Then, image information on each picture element thus picked up through the phase difference change is multiplied by $\sin(2\pi l/n)$ where $0 \leq l \leq n$ and then integrated. Through this process including integration, a contrast of phase-contrast image approximately 1.4 times as high as that attained using a phase plate coated with an absorption film having a transmission rate of 15% is attained. A response characteristic of the phase-contrast microscope in the case of such image emphasis is plotted in FIG. 13, which shows that the MTF curve of this embodiment is close to the MTF in the case of bright-field observation. In other words, phase-contrast observation is possible with a resolving power comparable to bright-field observation.

Figure 13:
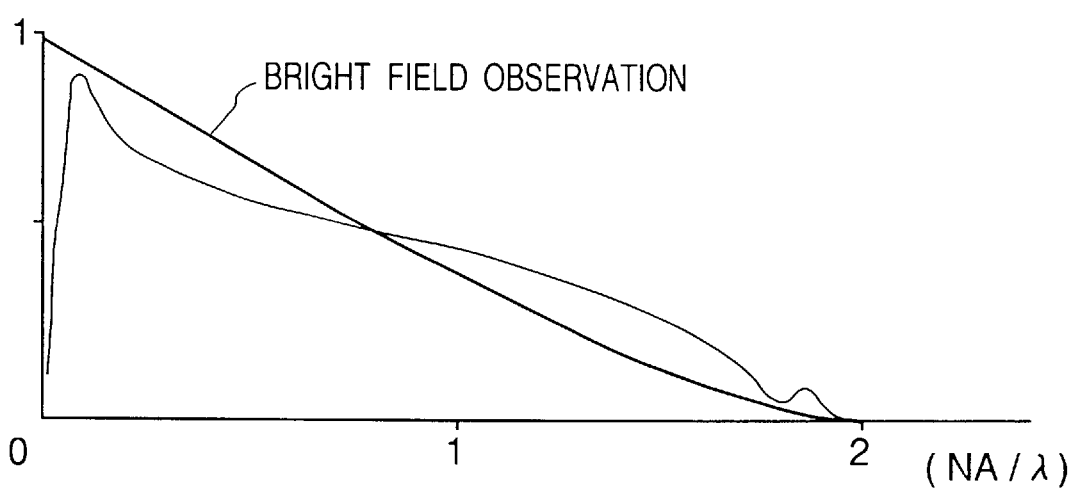
FIG. 13 graphs a response function for a sixth embodiment of the present invention applied to a phase-contrast microscope apparatus.

Also, a phase distribution can be obtained through a deconvolution process using the MTF shown in FIG. 13.

In the foregoing description on the fourth to sixth embodiments, the present invention is explained, for simplicity, based on the supposition that the phase plate including liquid crystal is disposed at the primary conjugate point of the pupil of the illumination optical system 2. However, the present invention is not limited to this specific arrangement. If the imaging optical system 3 includes an optical system for relaying the primary conjugate point of the pupil of the illumination optical system 2 to produce a secondary conjugate point of the same, an equivalent effect is obtained upon an arrangement where the phase plate 16 is located at the secondary conjugate point.

What is claimed is:

1. A microscope apparatus comprising:

a light source;

an illumination optical system for introducing light from said light source to an object;

an imaging optical system for obtaining an image of the object;

means for separating the light from said light source into two portions, disposed in said illumination optical system; and means for superimposing said two portions of the light on one another, disposed in said imaging optical system;

wherein said microscope apparatus further comprises:

an electronic image pickup device arranged on an image surface of said imaging optical system;

means for changing a phase difference between said two portions of the light;

means for storing images picked up by said electronic image pickup device; and means for processing information on the images picked up by said electronic image pickup device;

wherein the images are picked up by said electronic image pickup device as the phase difference is changed, to be stored as picked-up image information, and said picked-up image information is subjected to an integration process, upon being multiplied by a periodic function, as a weight function, which is given the phase difference as a variable, to produce final process image information.

2. A microscope apparatus according to claim 1, wherein said means for separating the light from said light source into two portions includes means for separating a light wave into an ordinary ray and an extraordinary ray, and said means for superposing the two portions of the light includes means for combining the ordinary ray and the extraordinary ray, so that said apparatus acts as a differential interference microscope apparatus.

3. A microscope apparatus according to claim 2, wherein said periodic function as the weight function is substantially a sine function.

4. A microscope apparatus according to claim 2 or 3, wherein the integration process is performed over an interval of at least one substantial period of said periodic function.

5. A microscope apparatus according to claim 2, wherein the integration process is performed using, independently, at least two periodic functions, as the weight functions, and at least two sets of primary process image information obtained thereby are stored to derive, as linearly combined together, said final process image information.

6. A microscope apparatus according to claim 4, wherein said periodic function, as the weight function, is substantially a sine function and a primary process image information obtained by the integration process is further subjected to an integration process with respect to a separation direction between the ordinary ray and the extraordinary ray using a separation width between the ordinary ray and the extraordinary ray on the object, thereby a shape or a phase distribution of the object with respect to the separation direction being obtained as said final process image information.

7. A microscope apparatus according to claim 4, wherein said periodic function, as the weight function, is substantially a sine function and primary process image information obtained by the integration process is further subjected to a deconvolution process using a separation width between the ordinary ray and the extraordinary ray on the object and a response function of an entire optical system determined by said illumination optical system and said imaging optical system, thereby a shape or a phase distribution of the object being obtained as said final process image information.

8. A microscope apparatus according to claim 1, wherein said means for separating the light from said light source into the two portions includes an annular aperture disposed at a pupil position of said illumination optical system, and said means for superimposing the two portions of the light includes a phase plate which is disposed in a vicinity of a pupil position of said imaging optical system and at which the phase difference between said two portions is changed by said means for changing a phase difference, so that said microscope apparatus acts as a phase-contrast microscope apparatus.

9. A microscope apparatus according to claim 8, wherein said periodic function, as the weight function, is substantially a sine function.

10. A microscope apparatus according to claim 8, wherein the integration process is performed with respect to a plurality of values of the phase difference restricted to an interval of one period of said periodic function as the weight function.

11. A microscope apparatus according to claim 8, wherein the integration process is performed over an interval of at least one period of said periodic function as the weight function.

12. A microscope apparatus according to claims 10 or 11, wherein said periodic function is substantially a sine function and primary process image information obtained by the integration process is further subjected to a deconvolution process using a response function determined by shapes and imaging characteristics of said aperture and said phase plate, thereby a phase distribution of the object being obtained as said final process image information.

\* \* \* \* \*